US011440388B2

(12) United States Patent
Yamada et al.

(10) Patent No.: US 11,440,388 B2
(45) Date of Patent: Sep. 13, 2022

(54) VEHICLE MOISTURE DRAINAGE SEAL

(71) Applicant: Toyota Motor Engineering & Manufacturing North America, Inc., Plano, TX (US)

(72) Inventors: Kenjiro Yamada, Ann Arbor, MI (US); Yoshitaka Nishimoto, Novi, MI (US); Kazuyuki Yamanaka, Novi, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 276 days.

(21) Appl. No.: 16/827,913

(22) Filed: Mar. 24, 2020

(65) Prior Publication Data
US 2021/0300165 A1 Sep. 30, 2021

(51) Int. Cl.
*B60J 10/25* (2016.01)
*B60J 10/86* (2016.01)
*B60J 10/24* (2016.01)
*B60J 5/04* (2006.01)
*B60J 10/84* (2016.01)

(52) U.S. Cl.
CPC ............. *B60J 10/25* (2016.02); *B60J 5/0468* (2013.01); *B60J 10/24* (2016.02); *B60J 10/84* (2016.02); *B60J 10/86* (2016.02)

(58) Field of Classification Search
CPC ............. B60J 10/25; B60J 10/36; B60J 10/80
USPC ....................................... 296/146.9; 49/476.1
See application file for complete search history.

(56) References Cited

U.S. PATENT DOCUMENTS

| 10,696,147 B2 * | 6/2020 | Baskar .................. B60J 10/244 |
| 2012/0186159 A1 * | 7/2012 | Thiele ..................... E05B 77/34 |
| | | 49/449 |
| 2017/0021708 A1 | 1/2017 | Thiele et al. |
| 2017/0113527 A1 | 4/2017 | Ishikawa et al. |

* cited by examiner

*Primary Examiner* — Dennis H Pedder
(74) *Attorney, Agent, or Firm* — Christopher G. Darrow; Darrow Mustafa, PC

(57) ABSTRACT

A vehicle door seal includes a first wall portion and a second wall portion extending from the first wall portion, the first wall portion and second wall portion combining to define a flow passage. A projection extends from an exterior surface of the second wall portion along an entire length of the second wall portion. The projection is structured to convey excess moisture from a relatively higher portion of the seal downwardly toward another, relatively lower portion of the seal for drainage.

14 Claims, 5 Drawing Sheets

VEHICLE MOISTURE DRAINAGE SEAL

TECHNICAL FIELD

The present invention relates to seals for vehicle doors and, more particularly, to a seal mountable in a seam between a vehicle door and door frame and structured for directing excess moisture along the seal.

BACKGROUND

A vehicle may include a side door mounted in a door frame formed in the vehicle body. A door latch assembly may be mounted in a seam extending between the door and the door frame, to maintain the door in a closed condition when so desired. Moisture from rain and melting snow may enter the seam and may subsequently drip or migrate down onto elements of the latch assembly. The moisture may then freeze, possibly holding the door in the closed condition and compelling a user to attempt to force the latch and/or door open, possibly damaging the door and/or latch.

SUMMARY

In one aspect of the embodiments described herein, a vehicle door seal includes a first wall portion and a second wall portion extending from the first wall portion, the first wall portion and second wall portion combining to define a flow passage. A projection extends from an exterior surface of the second wall portion along an entire length of the second wall portion.

In another aspect of the embodiments described herein, a vehicle includes a vehicle door frame and a vehicle door mounted in the vehicle door frame. A latch member extends from one of the vehicle door and the vehicle door frame. A latch slot is formed along the other one of the vehicle door and the vehicle door frame. A seal is mounted between the vehicle door and a vehicle door frame along one of the vehicle door and the vehicle door frame. At least a portion of the seal is positioned above the latch member and the latch slot. The seal includes a projection structured so as to form a vertically lowermost portion of the seal along any vertical cross section of the seal when the seal is mounted to the one of the vehicle door and the vehicle door frame.

DETAILED DESCRIPTION

Figure 1:
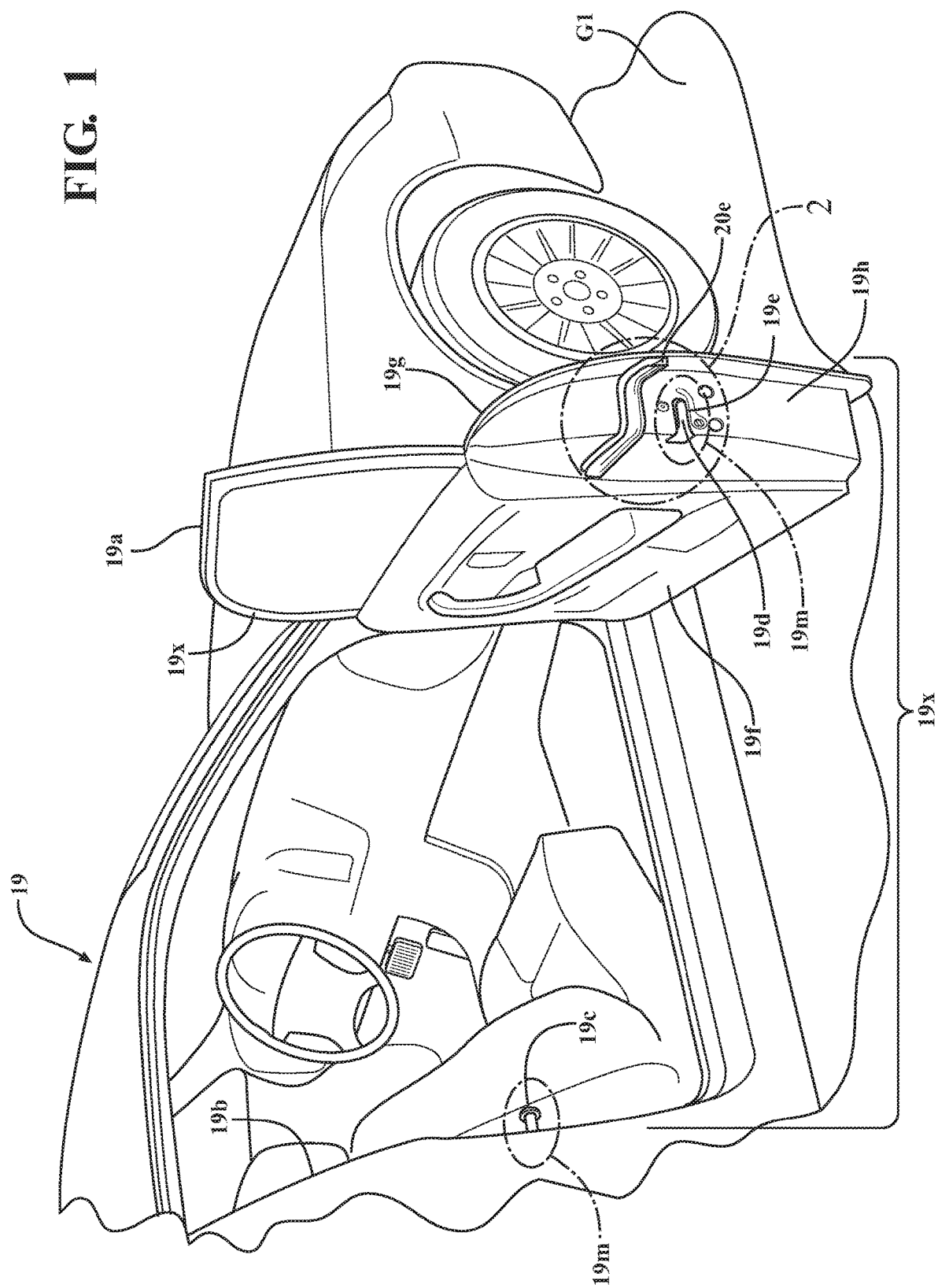
FIG. 1 is a schematic side perspective view of a vehicle showing an open vehicle side door mounted in a vehicle door frame, with an embodiment of a vehicle door seal mounted on the door.

Embodiments described herein relate to a vehicle door seal mountable in a vehicle between a vehicle door and a door frame in which the door is mounted. A door latch mechanism may secure the door in a closed condition, and may be releasable to enable the door to be opened. At least a portion of the door seal resides vertically above the latch mechanism. The door seal is structured to provide a flow channel for moisture entering a seam between the door and the door frame and migrating downwardly toward the latch mechanism. The seal flow channel intercepts moisture that would otherwise impinge upon the latch mechanism and channels the moisture away from the latch mechanism and in a downward direction toward an end of the channel, where the moisture exits the channel for drainage.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Unless otherwise noted, similar reference characters are used to describe similar features on separate elements and/or embodiments.

Figure 2:
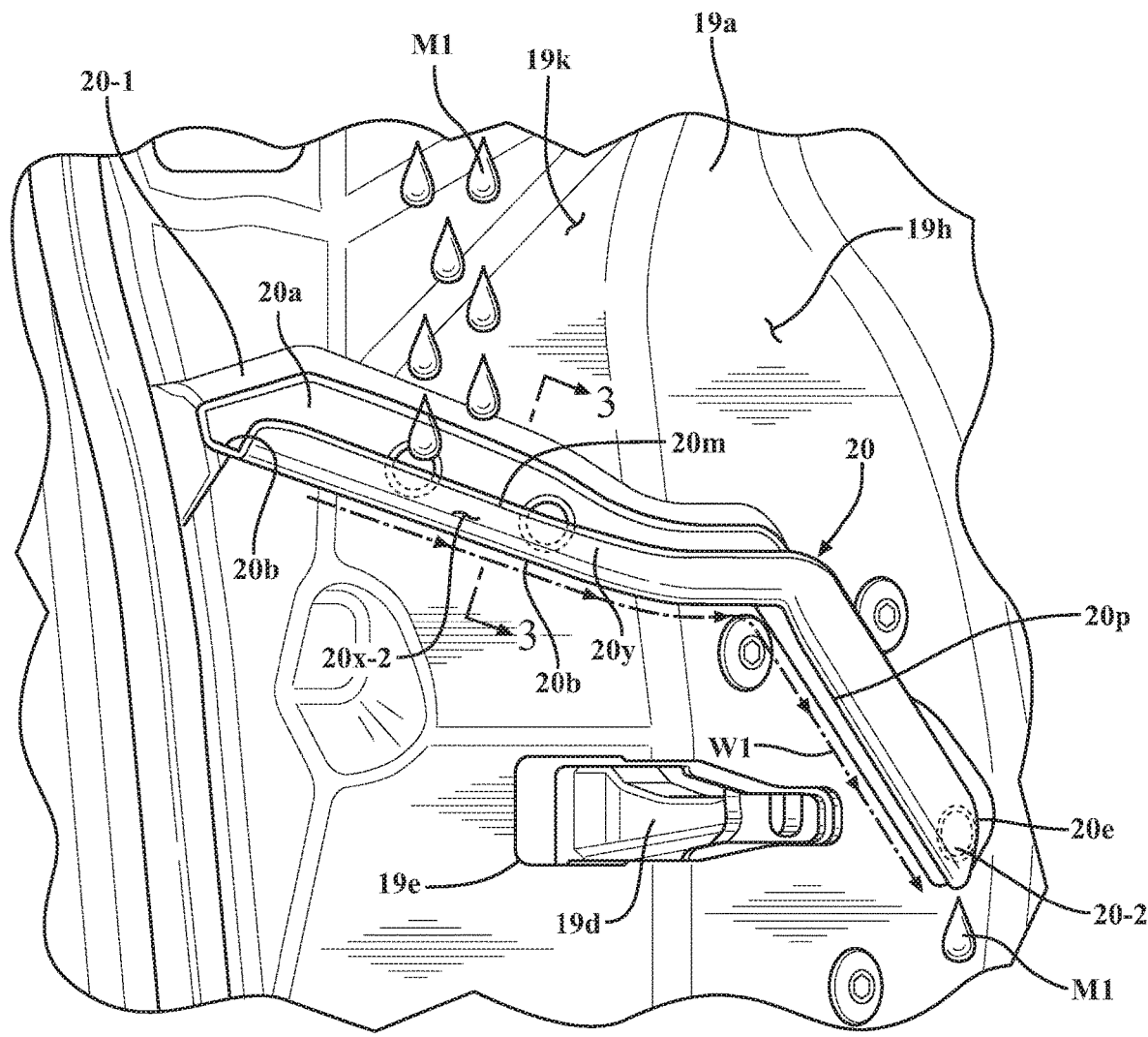
FIG. 2 is a magnified view of a portion of the view of FIG. 1.

FIGS. 1 and 2 show a portion of a vehicle 19 including a vehicle door seal 20 in accordance with an embodiment described herein. The vehicle may have a door 19a and a door frame 19b (i.e., a portion of the vehicle body) in which the door 19a of the vehicle is mounted. Generally, the vehicle door seal 20 may be mounted to one of the door 19a and the door frame 19b so that the seal is positioned between the vehicle door 19a and the vehicle door frame 19b when the door is closed. The vehicle door seal 20 may provide a moisture barrier along at least a portion of a gap between the vehicle door 19a and the door frame 19b.

As is known in the pertinent art, pivoting the door 19a to seat the door in the door frame 19b may activate a door latching mechanism (generally designated 19m) designed to latch the door in a closed condition. The latching mechanism 19m may include a latch member 19c and a device 19d structured to engage the latch member 19c to latch the door 19a. In one or more arrangements, the latch member 19c may extend from the door frame 19b and the door 19a may include a latch slot 19e in which the latch member engaging device 19d is housed. When the door 19a is closed by pivoting the door to seat the door 19a in the door frame 19b, the latch member 19c may enter the latch slot 19e to actuate the engaging device 19d to latch the door 19a in the closed condition. To open the door, a user may actuate a lever (not shown) coupled to the engaging device 19d, thereby disengaging the latch member 19c from the engaging device 19d and enabling the door 19a to be pivoted back to the open condition. In alternative arrangements, the latch member 19c may be mounted on the door 19a and the latch slot 19e containing the remainder of the latching mechanism may be incorporated into the door frame 19b.

Referring to FIGS. 1 and 2, in one or more arrangements, the seal 20 may be mounted on the vehicle door 19a. As seen in FIGS. 1 and 2, at least a portion of the seal 20 may be positioned to reside above the latch member 19c and the latch slot 19e when the door 19a is closed. In this position the seal 20 may be positioned to intercept moisture (from rain, melting snow, etc.) entering a seam between the door 19a and the frame 19b, to prevent moisture from falling onto the latch member 19c and/or migrating to other elements of the door latch mechanism 19m. As used herein, a feature of a vehicle is considered to be positioned "above" another feature of the vehicle when the vertical distance from the feature to a ground surface on which the vehicle resides is greater than a vertical distance from the other feature to the ground surface.

The vehicle door 19a may include a door inner surface 19f, a door outer panel 19g coupled to the door inner surface 19f and residing opposite the door inner surface, and a door end surface 19h extending between the door inner surface 19f and the door outer panel 19g. In one or more arrangements, and as shown in FIG. 2, the door inner surface 19f and door end surface 19h may both be incorporated into a door inner panel 19k attached to the door outer panel 19g, with the door inner surface 19h extending from the door inner surface 19f. A portion of the door end surface 19h may extend opposite and parallel (or nearly parallel) with the door outer panel 19g. In the embodiment shown in FIGS. 1 and 2, the door latch slot 19e is formed along the door end surface 19h, and the seal 20 is mounted to the door end surface 19h above the door latch slot 19e.

Figures 3, 3A:
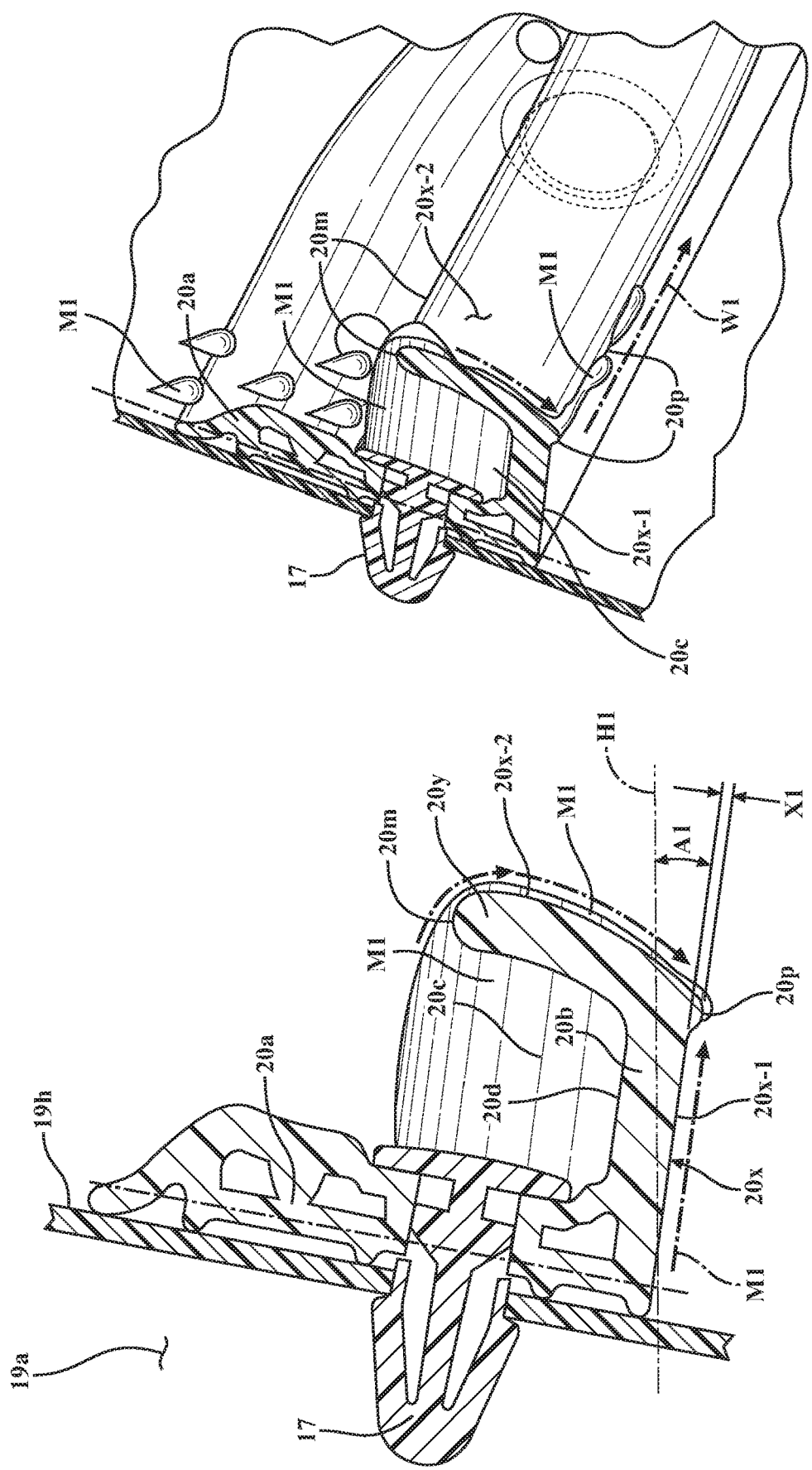
FIG. 3 is a cross-sectional view of the door seal shown in FIGS. 1 and 2 shown mounted to a vehicle door.
FIG. 3A is a schematic perspective view of the seal shown in FIGS. 1-3, illustrating an overflow of excess moisture from the seal and a flow of the excess moisture downwardly along a projection formed on a lowermost surface of the seal.

FIG. 3 shows an end cross-sectional view of an embodiment of the vehicle door seal 20. Each embodiment of the door seal as described herein may have a cross-section as shown in one of FIGS. 3 and 4 (described in greater detail below). Seal 20 may include a first wall portion 20a and a second wall portion 20b extending from the first wall portion 20a. The first wall portion 20a and second wall portion 20b may combine to define a flow passage 20c therebetween. The flow passage 20c may be structured to confine and direct moisture falling onto the seal 20 to a location where the moisture may be discharged from the flow passage 20c without impinging on elements of the latching mechanism 19m.

The first wall portion 20a may be structured to attachable or mountable to door 19a along the vehicle door end surface 19h above the latch slot 19e. The first wall portion 20a may be attached to the door 19a or door frame 19b using any suitable method, for example, mechanical fasteners 17, double-sided tape, or adhesives.

An interior surface 20d of the second wall portion 20b may be a surface along a first side of the second wall portion 20b and facing into the flow passage 20c, while an exterior surface 20x of the second wall portion 20b may be a surface along a second side of the second wall portion 20b residing opposite the first side. Moisture entering the flow passage 20c may flow along the interior surface 20d to a discharge end 20e of the seal 20 as described herein.

As seen in FIGS. 3 and 3A, under certain conditions, an amount of moisture M1 flowing through the flow passage 20c may cause the moisture to overflow the passage over a free edge 20m of the second wall portion 20b and down a portion 20x-2 of exterior surface 20x adjacent the free edge 20m. Also, moisture M1 may flow between the first wall portion 20a and the door end surface 19h to which the first wall portion 20a is attached, then along another portion 20x-1 of the exterior surface 20x extending from first wall portion 20a. In such a case, without seal 20, the overflowing moisture M1 may drop down onto one or more elements of the door latching mechanism 19m.

To prevent such moisture overflow M1 from dropping off of the seal 20 and to direct the overflow moisture M1 toward the discharge end 20e of the seal 20, the second wall portion 20b may incorporate a projection 20p extending from the second wall portion exterior surface 20x and along an entire length of the second wall portion 20b. It has been found that the projection 20p functions as a focused, localized region of adhesion of moisture M1 to the seal 20. That is, the seal 20 may be structured so that moisture overflowing the flow passage 20c or otherwise flowing along the seal 20 outside the flow passage 20c may flow downwardly along the seal 20 to the projection 20p. This moisture M1 then adheres to the projection 20p and flows along a length of the projection in a downward direction to the discharge end 20e of the flow passage 20c. In this manner, the excess moisture M1 may be prevented from dropping down from the seal 20 onto the elements of the latching mechanism 19m.

In one or more embodiments, the projection 20p has a semi-cylindrical cross-sectional shape. However, the projection 20p may have any cross-sectional shape suitable for the purposes described herein.

In some embodiments of the vehicle door 19a, the door end surface 19h may be inclined with respect to the horizontal as shown in FIG. 3. Generally, the cross-sectional shape of the seal 20 may be structured and mounted to the door 19a (or, alternatively, to the door frame 19b) so as to urge the moisture M1 along exterior surfaces of the second wall portion 20b toward the projection 20p. To this end, in the embodiment shown in FIGS. 3 and 3A, the seal 20 may be structured and mounted to the door 19a so that the portion 20x-1 of the exterior surface 20x of the second wall portion extends downwardly from the vehicle door 19a, with respect to a horizontal plane H1 intersecting the portion 20x-1 of the exterior surface 20x. In one or more particular arrangements, the exterior surface portion 20x-1 extends downwardly from the vehicle door at an angle A1 of at least 16° with respect to the horizontal plane H1.

The seal 20 may be structured so that the projection 20p forms a vertically lowermost portion of the seal 20 along any vertical cross section of the seal when the seal 20 is mounted to one of the vehicle door 19a and the vehicle door frame 19b. The projection 20p forms a vertically lowermost portion of a cross-section of the seal 20 when the projection 20p is spaced vertically from a ground surface G1 (FIG. 1) on which the vehicle resides, a distance less than any other portion of the seal 20. A vertical cross-section of the seal 20 may be a cross-section taken along a vertical plane passing through the seal.

Referring to FIGS. 3 and 3A, in one or more arrangements of the cross-section shown, the second wall portion 20b may include a flat exterior surface portion 20x-1 extending from the first wall portion 20a. The second wall portion 20b may also include an opposing portion 20y extending opposite the first wall portion 20a. Opposing portion 20y may include another portion 20x-2 of the second wall portion exterior surface 20x extending between the free edge 20m and the projection 20p. The projection 20p may extend from an edge of the opposing portion 20y. In one or more particular arrangements, and as shown in FIG. 3, the projection 20p may extend from an intersection of the flat exterior surface portion 20x-1 and the opposing portion 20y.

The moisture M1 flowing along the seal 20 outside the flow passage 20c may flow along the exterior surface portions 20x-1 and 20x-2. In other embodiment, the flat exterior surface portion 20x-1 may not be perfectly flat as long as it extends continuously downwardly from the first wall portion 20a.

Figure 4:
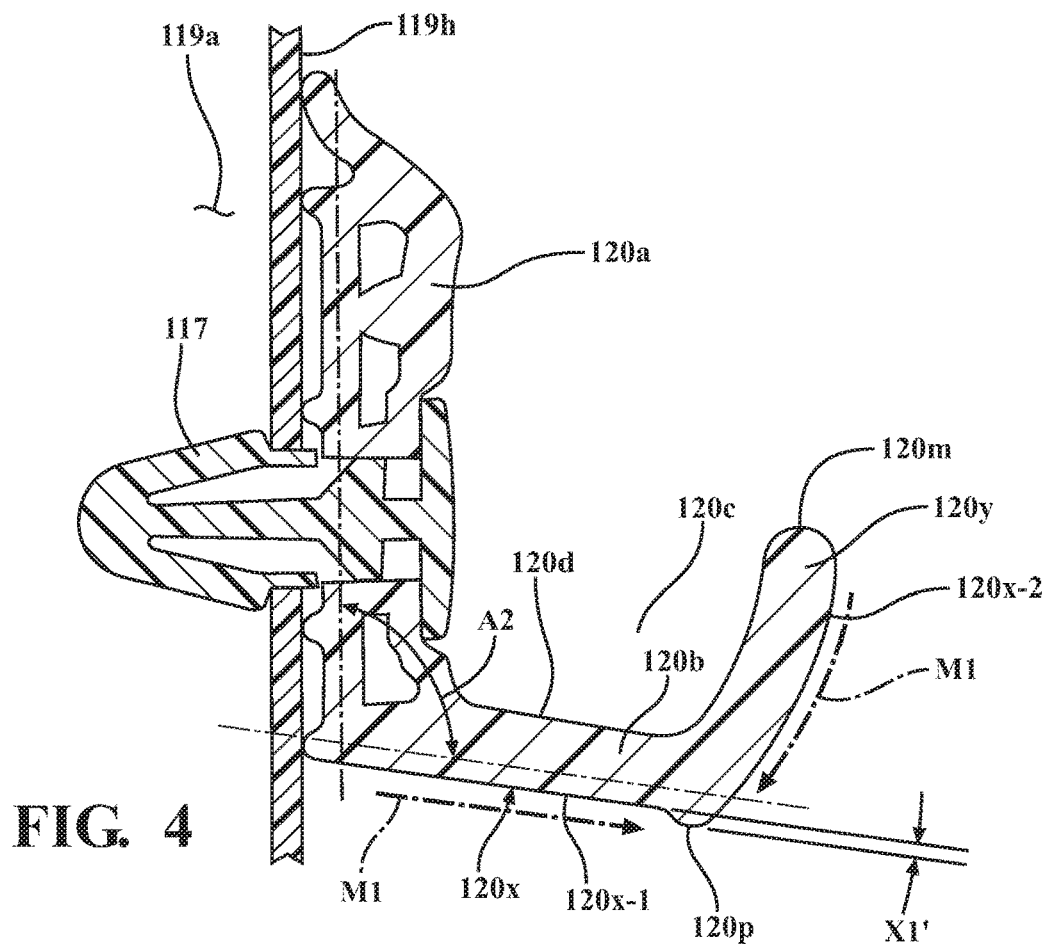
FIG. 4 shows an alternative embodiment of the seal cross-section shown in FIGS. 3 and 3A.

Referring to FIGS. 3 and 3A, in vehicles where the surface on the door 19a or door frame 19b on which the seal 20 is mounted are non-vertical and sloped so as to face toward the ground surface G1, the flat exterior surface portion 20x-1 may extend orthogonally or substantially orthogonally from the first wall portion 20a. FIG. 4 shows an alternative embodiment of the seal cross-section shown in FIGS. 3 and 3A. Referring to FIG. 4, in vehicles where seal mounting surfaces 119h of the door 199a (or door frame) are vertical or substantially vertical, the flat exterior surface portion 120x-1 may extend from the first wall portion 120a so as to form an obtuse included angle A2 with the first wall portion 120a (and/or surface 119h). This helps ensure that moisture M1 flowing along the exterior surface portion 120x-1 will be directed downwardly toward the projection 120p.

In one or more particular arrangements, and as shown in FIG. 3, the projection 20p may extend a predetermined distance X1 beyond the flat exterior surface portion 20x-1. In one or more particular arrangements, the projection 20p extends a distance of at least 0.5 mm beyond the flat exterior surface portion 20x-1. The surface area of the projection 20p may be increased to increase the area of adhesion of the moisture M1 to the projection. This may function to increase a flow capacity of moisture along the projection 20p.

Materials of manufacture and/or material surface finishes for the seal 20 may include materials to which water has a relatively high adhesion, and also which are suitable for forming a seal or weather-stripping around openings on a vehicle. Possible materials include EPDM rubber, thermoplastic elastomer mixes of rubber and plastic, thermoplastic olefin polymer/filler blends, thermoplastic styrene polymer/filler blends, vinyl chloride resins, and any other suitable material.

In one or more arrangements, a vehicle door assembly 19x may be provided including vehicle door 19a and an embodiment of a vehicle door seal as described herein.

Operation of the seal 20 to direct moisture M1 away from the latching mechanism 19m may be seen with reference to FIGS. 2, 3, and 3A. FIGS. 2 and 3A show moisture M1 dripping down onto a door-mounted seal 20 in accordance with an embodiment described herein. The moisture M1 may drip into the flow passage 20c. If a flowrate of moisture into the flow passage 20c exceeds a flowrate of moisture out of the flow passage discharge end 20e, moisture M1 may flow out of the flow passage 20c over the free edge 20m of second wall portion 20b as shown in FIGS. 2, 3 and 3A. If the seal 20 is not in intimate contact with the portion of the vehicle (door end surface or door frame) to which the seal 20 is attached, moisture M1 may also flow between the seal first wall portion 20a and the portion of the vehicle 19h to which the seal is attached.

The excess moisture M1 may flow along exterior surfaces 20x-1 and 20x-2 of the second wall portion 20b toward the projection 20p. When the moisture M1 reaches the projection 20p, the moisture M1 adheres to the projection 20p extending along the length of the seal second wall portion 20b and flows along the projection 20p in a generally downward direction as indicated by arrows W1 (FIGS. 2 and 3A), according to the descending structural and mounting configuration of the seal 20. As the moisture M1 adheres to the seal 20, the moisture M1 flows past the latch slot 19e and the elements of the latching mechanism 19m.

FIGS. 2-3A (previously described) and 5-7 show various possible forms of seals incorporating an embodiment of the cross-section described above.

In one or more particular arrangements, and as shown in FIGS. 2-3A (previously described), the seal 20 may extend along a portion of the door inner surface 19f and along the door end surface 19h, terminating at a discharge end 20e located just past the latch slot 19e.

Figure 5:
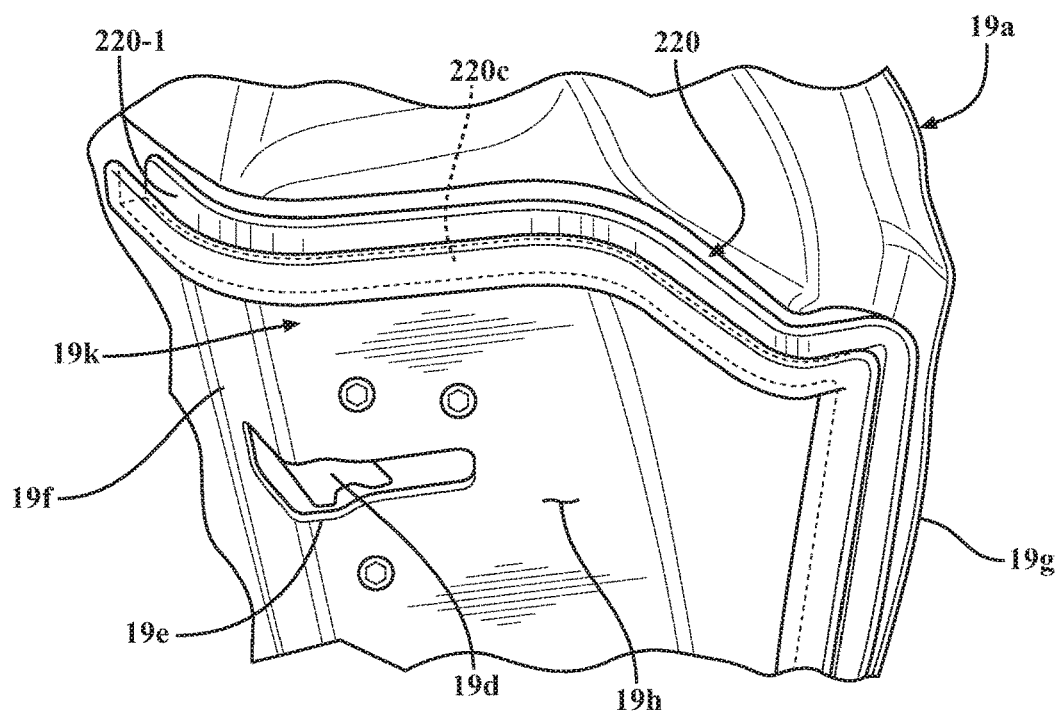
FIG. 5 is a schematic perspective view of a particular embodiment of a seal incorporating a cross section in accordance with one of FIGS. 3-3A and 4.

In one or more other arrangements, as shown in FIG. 5, a seal 220 may be mounted on the door 19a above the latch slot 19e and may extend along at least a portion of the door inner surface 19f and along the end surface 19h. The seal 220 may continue to an edge of the door inner panel 19k and may then be directed downwardly to discharge any moisture flowing along the seal flow passage 220c.

Embodiments of the seal described herein may have a first end and a second end opposite the first end. For example, the seal 20 shown in FIGS. 2-3A has a first end 20-1 mounted along the door inner surface 19f and a second end 20-2 mounted along the door end surface 19h. The embodiments of the seal described herein may be structured so that a vertical height of the seal projection is less at the seal second end than at the seal first end when the seal is mounted to the one of the vehicle door and the vehicle door frame. This ensures a general downward flow of the moisture along the projection. In some embodiments, some portions of the seal may have a greater or more extreme downward slope than other portions. In such cases, the momentum acquired by the moisture during traversal of the relatively "steeper" portions of the flow passage may carry the moisture along the more level portions of the flow passage.

A length of the seal may be a total or combined length of a combination of all portions of the seal along which moisture flows through the flow passage, taken along a lowermost location within the flow passage for each cross-section of the flow passage. For example, a length of seal 20 of FIGS. 2-3A may be a total or combined length of a combination of all portions of the seal along which moisture flows through the flow passage 20c, taken along a lowermost location within the flow passage 20c for each cross-section of the flow passage.

A length of the seal projection may be a total or combined length of all portions of the projection extending along the second wall portion exterior surface in a direction along the exterior surface leading from the seal first end toward the seal second end. For example, a length of the projection 20p of FIGS. 2-3A may be a total or combined length of all portions of the projection 20p extending along the second wall portion exterior surface 20x in a direction along the exterior surface leading from the seal first end 20-1 toward the seal second end 20-2.

In the seal embodiment shown in FIG. 5 the seal first end 220-1 may be directly attached or coupled to the door inner surface 19f and may extend along the door end surface 19h, gradually sloping downwardly to the edge of the inner door panel 19k from where it may proceed downwardly along a seam between the door inner panel 19k and the door outer panel 19g.

Figure 6:
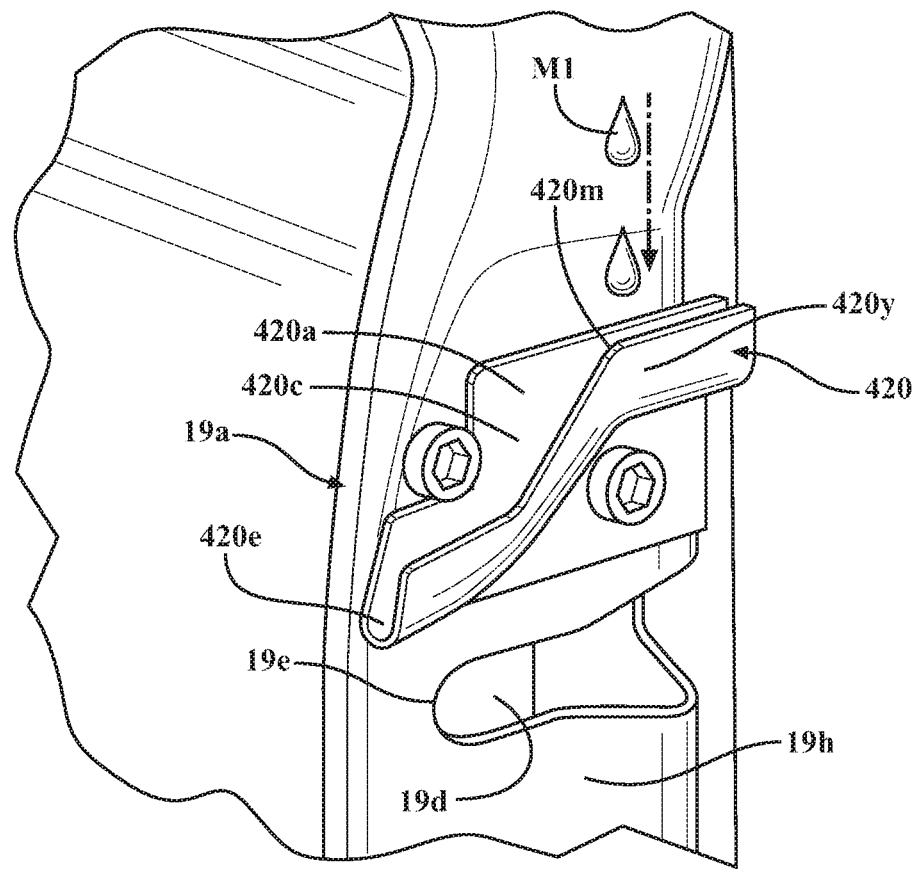
FIG. 6 is a schematic perspective view of another particular embodiment of a seal incorporating a cross section in accordance with one of FIGS. 3 and 4.

Referring to FIG. 6, in one or more other particular arrangements, a shorter version 420 of the seal may be mounted to the door 19a above the latch slot 19e and each end of the seal may overlap a side edge of the latch slot. Moisture M1 dropping down into the seal flow passage 420c is prevented from reaching the latch slot 19e and is directed along the flow passage 420c to the discharge end 420e.

Figure 7:
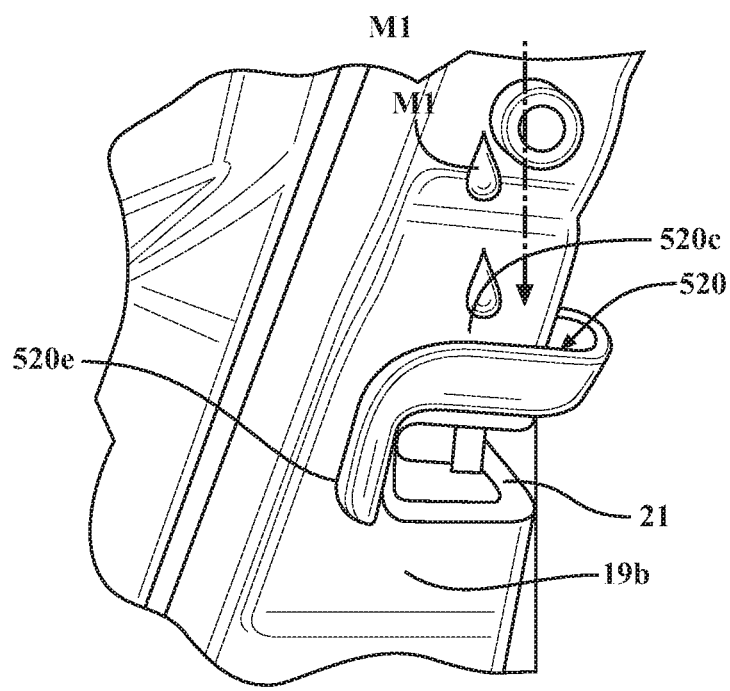
FIG. 7 is a schematic perspective view of yet another particular embodiment of a seal incorporating a cross section in accordance with one of FIGS. 3-3A and 4.

In one or more other arrangements, as seen in FIG. 7, an embodiment of the seal 520 may be positioned above a latch member 21 mounted in the vehicle door frame 19b. The seal 520 may be mounted above the latch member 21 and may be structured to intercept and redirect moisture M1 flowing down onto the seal 520 in the manner previously described. Embodiments of the seal mounted to the door frame 19b may have the same cross-sectional structure as shown in FIG. 3 or FIG. 4. Moisture M1 may flow along flow passage 520c to a discharge end 520e of the seal 520.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A vehicle door seal comprising:
   a first wall portion;
   a second wall portion extending from the first wall portion, the first wall portion and second wall portion combining to define a flow passage; and
   a projection extending from an exterior surface of the second wall portion and spaced apart from the first wall portion along an entire length of the second wall portion.

2. The vehicle door seal of claim 1 wherein the projection has a semi-cylindrical cross-sectional shape.

3. The vehicle door seal of claim 1 wherein the first wall portion includes a first straight exterior surface and the second wall portion includes a second straight exterior surface extending from the first straight exterior surface so as to form an obtuse included angle with the first straight exterior surface.

4. The vehicle door seal of claim 3 wherein the second wall portion further includes an opposing portion extending opposite the first wall portion, and wherein the projection extends from an edge of the opposing portion.

5. The vehicle door seal of claim 4 wherein the projection extends from an intersection of the second straight exterior surface and the opposing portion.

6. The vehicle door seal of claim 3 wherein the projection extends a distance of at least 0.5 mm beyond the second straight exterior surface.

7. A vehicle door assembly comprising a vehicle door and a vehicle door seal in accordance with claim 1.

8. A vehicle including a vehicle door frame and a seal in accordance with claim 1.

9. A vehicle comprising:
   a vehicle door frame;
   a vehicle door mounted in the vehicle door frame;
   a latching mechanism including a latch member and a latch member engaging device structured to engage the latch member to latch the vehicle door; and
   a seal mounted along the vehicle door between the vehicle door and the vehicle door frame, the seal including a first wall portion and a second wall portion, at least a portion of the seal being positioned above the latch member and the latch member engaging device, the seal including a projection extending from an exterior surface of the second wall portion and spaced apart from the first wall portion along an entire length of the second wall portion.

10. The vehicle of claim 9 wherein the seal has a first end and a second end opposite the first end, wherein the seal is structured so that a vertical height of the projection is less at the second end than at the first end when the seal is mounted to the one of the vehicle door and the vehicle door frame.

11. The vehicle of claim 9 wherein the vehicle door has a door inner surface, a door outer panel coupled to the door inner surface and residing opposite the door inner surface, and a door end surface extending between the door inner surface and the door outer panel, wherein a door latch slot is formed along the door end surface, and wherein the seal is mounted to the door end surface above the door latch slot.

12. The vehicle of claim 9 wherein the door latch member is coupled to and extends from the vehicle door, and wherein the seal is mounted to the door above the door latch member.

13. The vehicle of claim 9 wherein the seal has the first wall portion mounted to the vehicle door, and a second wall portion extending from the first wall portion in a direction away from the the vehicle door, wherein an exterior surface of the second wall portion extends downwardly from the vehicle door, with respect to a horizontal plane intersecting the exterior surface.

14. The vehicle of claim 13 wherein the exterior surface of the second wall portion extends downwardly from the vehicle door at an angle of at least 16° with respect to the horizontal plane.

* * * * *